United States Patent
Huang et al.

(10) Patent No.: US 7,492,112 B2
(45) Date of Patent: Feb. 17, 2009

(54) APPARATUSES AND METHODS FOR CONTROLLING ROTATIONAL DIRECTION OF FAN

(75) Inventors: Hai-Rong Huang, Shenzhen (CN);
Tung-Min Cho, Tu-Cheng (TW);
Dao-Yuan Song, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 264 days.

(21) Appl. No.: 11/309,438

(22) Filed: Aug. 4, 2006

(65) Prior Publication Data
US 2008/0030154 A1    Feb. 7, 2008

(51) Int. Cl.
*H02P 1/00*    (2006.01)
(52) U.S. Cl. .................. 318/283; 318/280; 318/254; 318/287; 388/800; 388/811
(58) Field of Classification Search ............... 318/280, 318/254, 400.02–400.06, 400.12; 388/830, 388/831; 713/320, 323
See application file for complete search history.

(56) References Cited

U.S. PATENT DOCUMENTS

| | | | | | |
|---|---|---|---|---|---|
| 3,935,522 | A | * | 1/1976 | Tsay | .......................... 388/830 |
| 4,851,747 | A | | 7/1989 | Yang | |
| 5,513,361 | A | * | 4/1996 | Young | ......................... 713/320 |
| 5,825,642 | A | * | 10/1998 | Ishii et al. | .................... 363/141 |
| 5,848,282 | A | * | 12/1998 | Kang | .......................... 713/323 |
| 6,049,183 | A | * | 4/2000 | Lin | ............................. 318/434 |
| 6,054,823 | A | * | 4/2000 | Collings et al. | ......... 318/400.04 |
| 6,054,824 | A | * | 4/2000 | Hsieh | .......................... 318/445 |
| 6,307,338 | B1 | * | 10/2001 | Kuner et al. | ............ 318/400.26 |
| 6,386,226 | B1 | * | 5/2002 | Lopp et al. | ................ 137/454.6 |
| 6,565,334 | B1 | | 5/2003 | Bradbury et al. | |
| 6,650,074 | B1 | * | 11/2003 | Vyssotski et al. | ....... 318/400.12 |
| 6,700,339 | B2 | * | 3/2004 | Vyssotski et al. | ....... 318/400.26 |
| 6,703,803 | B2 | * | 3/2004 | Ohiwa et al. | ........... 318/400.17 |
| 6,750,623 | B1 | | 6/2004 | McCauley et al. | |
| 6,979,964 | B1 | * | 12/2005 | Roe | ........................... 318/139 |
| 6,995,534 | B2 | * | 2/2006 | Berroth et al. | .......... 318/400.22 |
| 7,015,665 | B2 | * | 3/2006 | Ohshima | ..................... 318/280 |
| 7,030,584 | B1 | * | 4/2006 | Alberkrack | ............ 318/400.03 |
| 7,064,510 | B2 | * | 6/2006 | Brannen et al. | ........... 318/400.3 |
| 7,088,565 | B2 | * | 8/2006 | Watanabe et al. | ............ 361/103 |
| 7,148,642 | B2 | * | 12/2006 | Brannen et al. | ........ 318/400.06 |
| 7,193,377 | B2 | * | 3/2007 | Fung | ..................... 318/400.01 |
| 7,221,858 | B2 | * | 5/2007 | Ku | ......................... 318/400.08 |
| 7,242,857 | B2 | * | 7/2007 | Wu et al. | .................. 318/400.2 |

(Continued)

*Primary Examiner*—Paul Ip
(74) *Attorney, Agent, or Firm*—Frank R. Niranjan

(57) ABSTRACT

An apparatus is used for controlling a rotating direction of a fan. The apparatus comprises a power source, a signaling unit, a switching unit, and an activating module. The power source is used for supplying power for the apparatus. The signaling unit is used for generating direction-control signals. The switching unit is connected to the power source and the signaling unit, and used for controlling the switching unit to work. The activating module is connected to the switching unit and the fan, and used for driving the fan to selectively rotate in one of two opposite directions based on the direction-control signals. A method for driving the fan in the two directions is also disclosed.

20 Claims, 5 Drawing Sheets

U.S. PATENT DOCUMENTS

| | | | |
|---|---|---|---|
| 7,248,005 B2 * | 7/2007 | Makaran | 318/66 |
| 7,262,570 B2 * | 8/2007 | Alberkrack et al. | 318/400.38 |
| 7,276,867 B2 * | 10/2007 | Alberkrack et al. | 318/400.24 |
| 2003/0155886 A1 * | 8/2003 | Ohiwa et al. | 318/727 |
| 2003/0198464 A1 * | 10/2003 | Horng et al. | 388/831 |
| 2003/0222608 A1 * | 12/2003 | Vyssotski et al. | 318/254 |
| 2004/0056617 A1 * | 3/2004 | Berroth et al. | 318/439 |
| 2005/0077849 A1 * | 4/2005 | Chuan-Fa | 318/268 |

* cited by examiner

APPARATUSES AND METHODS FOR CONTROLLING ROTATIONAL DIRECTION OF FAN

DESCRIPTION

1. Field of the Invention

The present invention generally relates to apparatuses and methods for controlling fans, and more particularly to an apparatus and a method for controlling rotational directions of a fan.

2. Description of Related Art

Nowadays, some electronic devices generate much heat when working. Such heat can adversely affect the operational stability of the electronic devices. Concretely, an accumulation of the heat in the electronic devices will lead to a temperature increase of the electronic devices, thus resulting in an unstable operation and even a destruction of the electronic devices. Therefore, the heat must be removed in time to keep the temperature of the electronic devices within a safe range. Fans have been used in the electronic devices for providing forced airflows to dissipate the heat.

However, large amount of debris such as dust, dirt, trash, and the like is doped in the airflows. The debris enters the electronic devices following the airflows, and lodges in the electronic devices. Accumulation of the debris baffles the cooling operations of the airflows.

A bi-directional fan has been used in the electronic devices for dislodging the debris. The fan can selectively rotate in a clockwise direction or an anti-clockwise direction. When rotating in the clockwise direction, the fan drives the airflow through the electronic device and takes the heat away. When rotating in the anti-clockwise direction, the fan dislodges the debris out of the electronic devices.

A conventional apparatus is used for controlling the fan to change its rotating direction by using a switch to change polarities of two electrodes of the fan. Thus, the fan can change its rotating direction as the polarities of the electrodes of the fan are changed.

However, the conventional apparatus cannot work automatically. Users need to manually operate the switch to change the rotating direction of the fan.

Therefore, an apparatus and a method for a fan are needed in the industry to address the aforementioned deficiencies and inadequacies.

SUMMARY OF THE INVENTION

An apparatus is used for controlling a rotating direction of a fan. The apparatus comprises a power source, a signaling unit, a switching unit, and an activating module. The power source is used for supplying power for the apparatus. The signaling unit is used for generating direction-control signals. The switching unit is connected to the power source and the signaling unit, and used for controlling the switching unit to work. The activating module is connected to the switching unit and the fan, and used for driving the fan to selectively rotate in one of two opposite directions based on the direction-control signals. A method for driving the fan in the two directions is also disclosed.

Other systems, methods, features, and advantages of the present apparatus and method will be or become apparent to one with skill in the art upon examination of the following drawings and detailed description. It is intended that all such additional systems, methods, features, and advantages be included within this description, be within the scope of the present device, and be protected by the accompanying claims.

BRIEF DESCRIPTION OF THE DRAWINGS

Many aspects of the present apparatus and the present method can be better understood with reference to the following drawings. The components in the drawings are not necessarily to scale, emphasis instead being placed upon clearly illustrating the principles of the present device. Moreover, in the drawings, like reference numerals designate corresponding parts throughout the several views.

DETAILED DESCRIPTION OF THE INVENTION

Reference will now be made to the drawings to describe a preferred embodiment of the present apparatus and a preferred embodiment of the present method.

Figure 1:
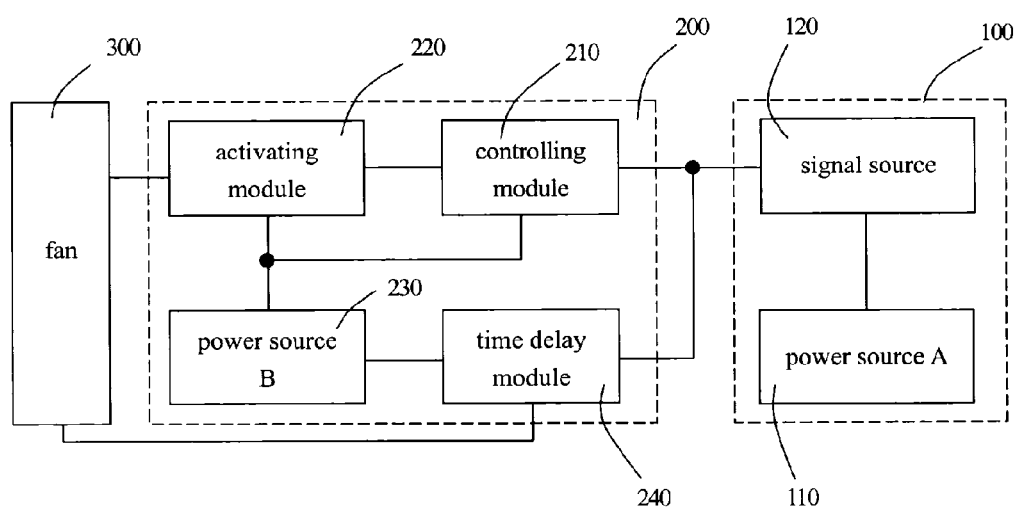
FIG. 1 is a block diagram showing a fan and an apparatus in accordance with an exemplary embodiment, the apparatus including a controlling module.

Referring to FIG. 1, an apparatus 200 is connected between an electronic device 100 and a fan 300. The fan 300 is able to rotate in either a clockwise direction or an anti-clockwise direction. The electronic device 100 may be a computer, a television, a projector, or the like. In this embodiment, the electronic device 100 is a computer. The electronic device 100 is used for sending control signals to the apparatus 200. The apparatus 200 receives the control signals and controls rotational directions of the fan 300 based on the control signals.

The electronic device 100 includes a power source A 110 and a signal source 120. The power source A 110 is used for supplying power to the signal source 120. The signal source 120 is used for generating the control signals, and sending the control signals to the apparatus 200. When the power source A 110 is turned on, the signal source 120 generates a low level voltage signal. When the power source A 110 is turned off, the signal source 120 generates a high level voltage signal.

The apparatus 200 includes a controlling module 210, an activating module 220, a power source B 230, and a time delay module 240. The controlling module 210 is connected to the signal source 120, the activating module 220, and the power source B 230. The activating module 220 is connected to the controlling module 210, the power source B 230, and the fan 300. The power source B 230 is used for supplying power to the controlling module 210 and the activating module 220. In this embodiment, the power source B 230 supplies a voltage of 12 volts. The time delay module 240 is connected to the signal source 120 and the power source B 230.

When the signal source 120 sends the low level voltage signal to the controlling module 210, the controlling module 210 generates and sends a positive signal to the activating module 220. The activating module 220 receives the positive signal and drives the fan 300 to rotate in the clockwise direction. The time delay module 240 is not activated.

On the other hand, when the signal source 120 sends the high level voltage signal to the controlling module 210, the controlling module 210 generates and sends a negative signal to the activating module 220. The activating module 220 receives the negative signal and drives the fan 300 to rotate in the anti-clockwise direction. The time delay module 240 also receives the high level voltage signal, and becomes activated. When a predetermined delay time specified in the time delay module 240 have elapsed, the fan 300 stops rotating.

Therefore, when the electronic device 100 is powered on, the apparatus 200 drives the fan 300 to rotate in the clockwise direction. When the electronic device 100 is powered off, the apparatus 200 drives the fan 300 to rotate in the anti-clockwise direction.

Figure 2:
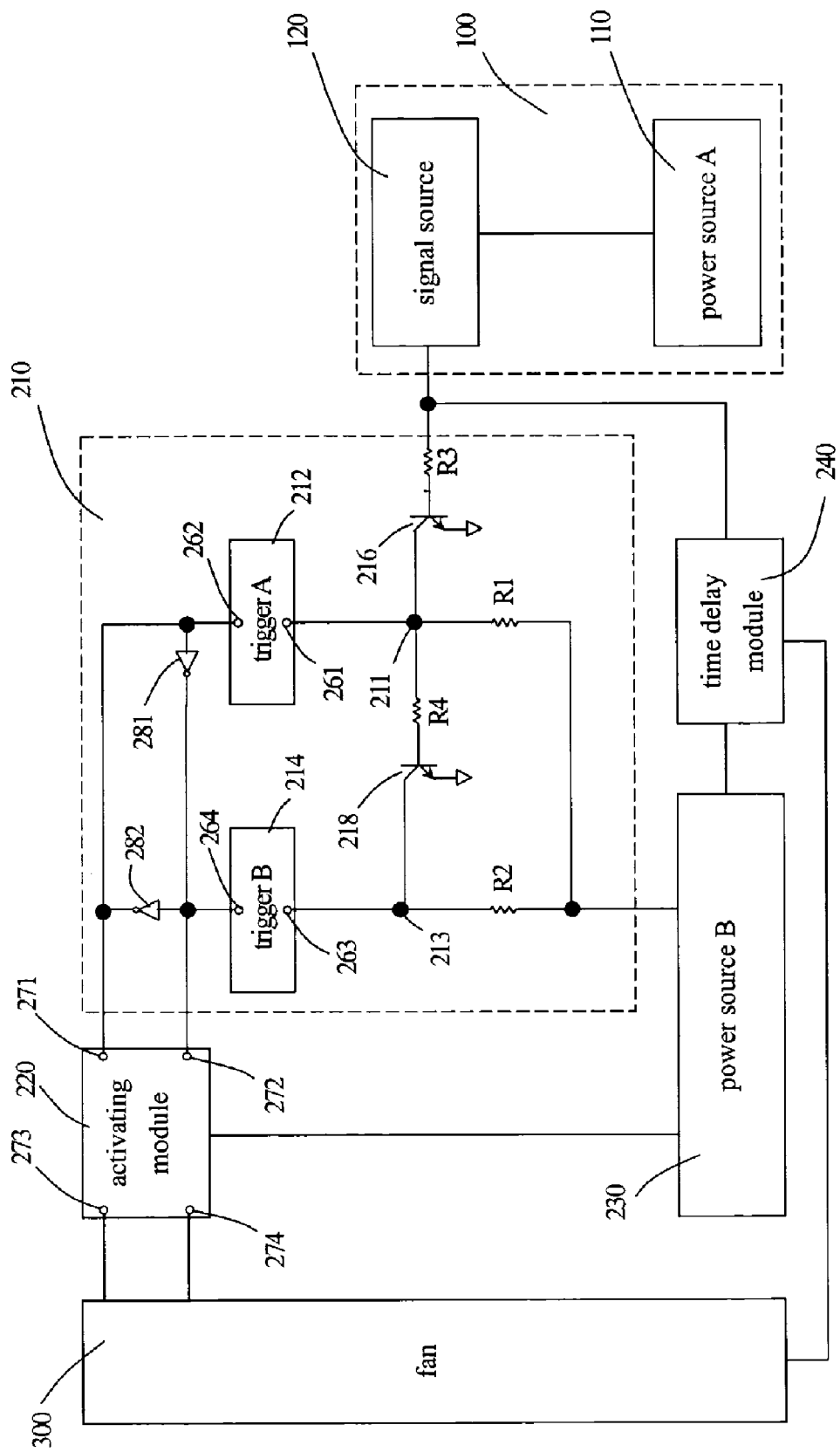
FIG. 2 is a block diagram showing a detailed structure of the controlling module of FIG. 1 in accordance with a first embodiment.

Referring to FIG. 2, the activating module 220 in accordance with a first embodiment has a first input terminal 271, a second input terminal 272, a first output terminal 273, and a second output terminal 274. The first output terminal 273 and the second output terminal 274 output a driving voltage to drive the fan 300 to rotate.

When the first input terminal 271 receives a high level voltage signal, and the second input terminal 272 receives a low level voltage signal, wherein the two signals combine to form the positive signal, the driving voltage outputted from the first output terminal 273 and the second output terminal 274 drives the fan 300 to rotate in the clockwise direction.

When the first input terminal 271 receives a low level voltage signal, the second input terminal 272 receives a high level voltage signal, wherein the two signals combine to form the negative signal, the driving voltage drives the fan 300 to rotate in the anti-clockwise direction.

The controlling module 210 has a first node 211 and a second node 213. An input terminal 261 of a trigger A 212 is connected to the first node 211. An output terminal 262 of the trigger A 212 is connected to the first input terminal 271 of the activating module 220, and further connected to the second input terminal 272 via a negation gate 281. A resistor R1 is connected between the first node 211 and the power source B 230. An input terminal 263 of a trigger B 214 is connected to the second node 213. An output terminal 264 of the trigger B 214 is connected to the first input terminal 271 of the activating module 220 via a negation gate 282 and further connected to the second input terminal 272. A resistor R2 is connected between the second node 213 and the power source B 230. The power source B 230 is used for supplying power to the trigger A 212 and the trigger B 214.

A first bipolar junction transistor (BJT) 216 is used as a switch for controlling the power from the power source B 230 receivable by the trigger A 212. A collector of the first BJT 216 is connected to the first node 211. An emitter of the first BJT 216 is connected to a first virtual ground point. A base of the first BJT 216 is connected to the signal source 120 via a resistor R3. A second BJT 218 is used as a switch for controlling the power from the power source B 230 receivable by the trigger B 214. A collector of the second BJT 218 is connected to the second node 213. An emitter of the second BJT 218 is connected to a second virtual ground point. A base of the second BJT 218 is connected to the first node 211 via a resistor R4.

When the base of the first BJT 216 receives the low level voltage signal, the first BJT 216 is disabled. The first node 211 connected to the power source B 230 is at a high level voltage. That is, the trigger A 212 is powered on, and the trigger A 212 generates the positive signal that is further sent to the activating module 220. The high level voltage at the first node 211 enables the second BJT 218, and the power transmitted from the power source B 230 to the second node 213 is directed to the second virtual ground point. Therefore, power from the power source B 230 to the trigger B 214 is discontinued by a short circuit established between the power source B 230 and the second virtual ground point.

When the base of the first BJT 216 receives the high level voltage signal, the high level voltage enables the first BJT 216. The power transmitted to the first node 211 is directed to the first virtual ground point. The trigger A 212 is discontinued by a short circuit established between the power source B 230 and the first virtual ground point. The second BJT 218 is disabled, and the second node 213 connected to the power source B 230 is at a high level voltage. That is, the trigger B 214 is powered on by the power source B 230. The trigger B 214 generates the negative signal and sends the negative signal to the activating module 220.

Figure 3:
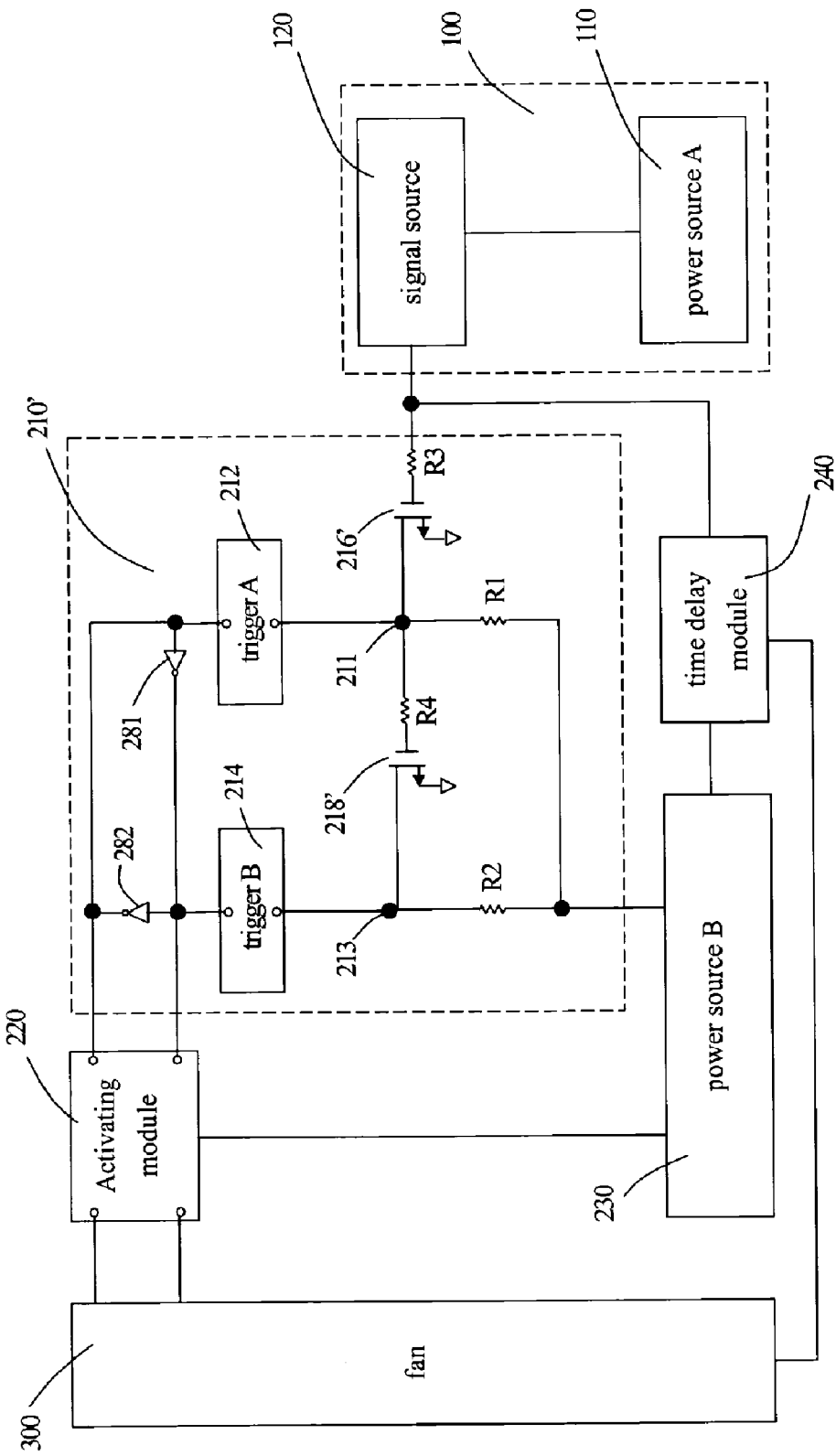
FIG. 3 is a block diagram showing a detailed structure of the controlling module of FIG. 1 in accordance with a second embodiment.

In a second embodiment, the first BJT 216 and the second BJT 218 may be replaced with FETs. Referring to FIG. 3, a first field effect transistor (FET) 216' is used to replace the first BJT 216, and a second FET 218' is used to replace the second BJT 218. Similarly, in a controlling module 210', a drain of the first FET 216' is connected to the first node 211. A source of the first FET 216' is connected to a first virtual ground point. A gate of the first FET 216' is connected to the signal source 120 via a resistor R3. A drain of the second FET 218' is connected to the second node 213. A source of the second FET 218' is connected to a second virtual ground point. A gate of the second FET 218' is connected to the first node 211 via a resistor R4.

As known, a BJT and a FET are both transistors. The poles of the BJT and the FET can be redefined based on their function. The base and the gate can be identified as an operating pole of the transistor; the emitter and the source can be identified as a grounding pole of the transistor; the collector and the drain can be identified as a controlling pole of the transistor.

The apparatus 200 can control the fan 300 to switch the rotating direction between a clockwise direction and an anti-clockwise direction automatically based on control signals from the electronic device 100. Therefore, not only can the fan 300 dissipate the heat of the electronic device 100 but can also dislodge the debris in the electronic device 100.

Figure 4:
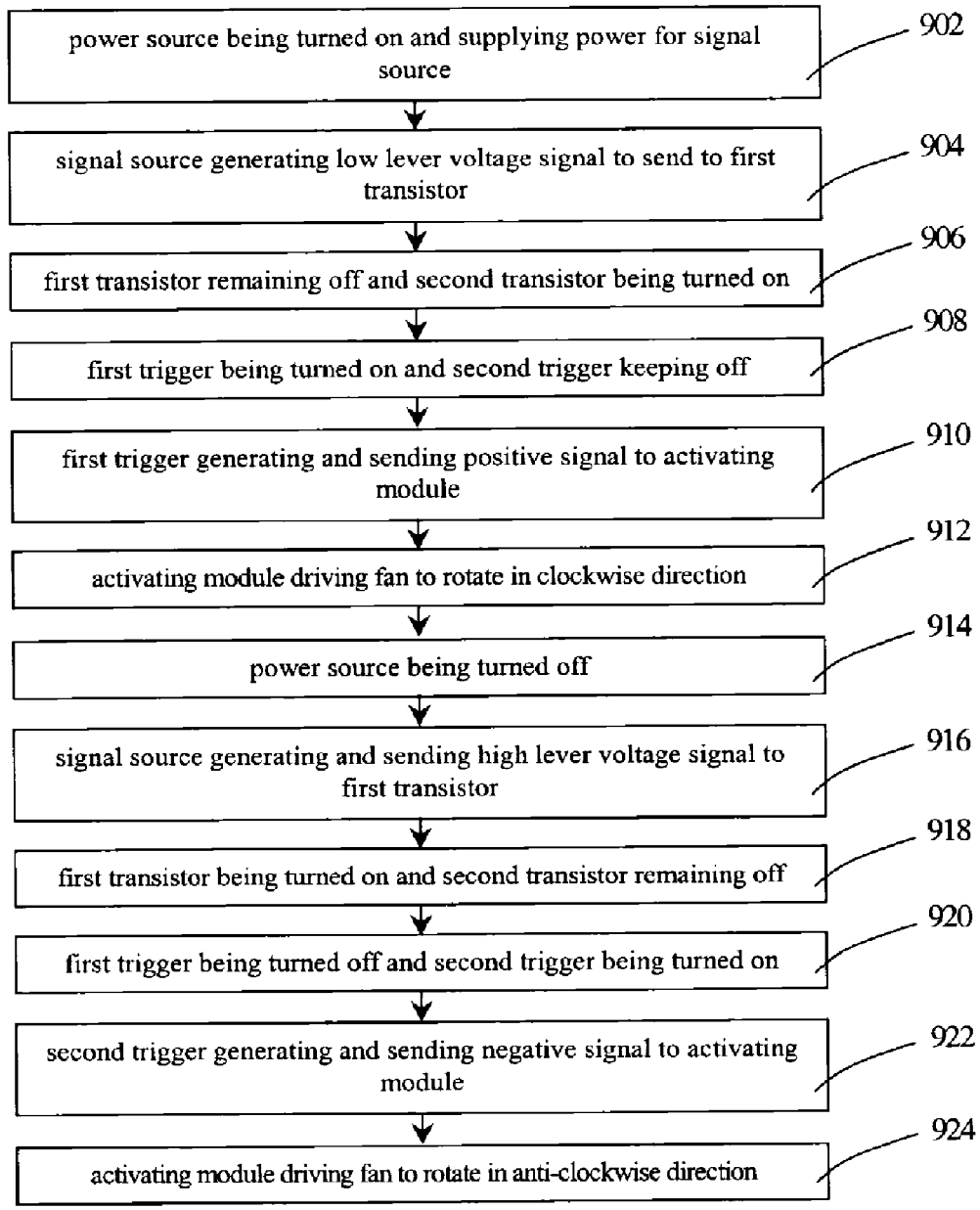
FIG. 4 is a process flow diagram of how a method is implemented in accordance with an exemplary embodiment.

Referring to FIG. 4, a process flow diagram in accordance with an exemplary embodiment illustrates a procedure of a method for driving the fan 300 to rotate bidirectionally. The procedure includes the following steps.

The power source A 110 is turned on and supplies power to the signal source 120 (step 902).

The signal source 120 generates the low level voltage signal that is further sent to an operating pole of a first transistor (step 904).

The first transistor is disabled and a second transistor becomes enabled, with the first node 211 being at the high level voltage, and the second node 213 being at the low level voltage (step 906).

The trigger A 212 is powered on, and the trigger B 214 is powered off (step 908).

The trigger A 212 generates the positive signal that is further sent to the activating module 220 (step 910).

The activating module 220 drives the fan 300 to rotate in the clockwise direction (step 912).

The power source A 110 is turned off (step 914).

The signal source 120 generates the high level voltage signal that is further sent to the operating pole of the first transistor (step 916).

The first transistor becomes enabled and the second transistor becomes disabled, with the first node 211 being at the low level voltage, and the second node 213 being at the high level voltage (step 918).

The trigger A 212 is powered off, and the trigger B 214 is powered on (step 920).

The trigger B 214 generates the negative signal that is further sent to the activating module 220 (step 922).

The activating module 220 drives the fan 300 to rotate in the anti-clockwise direction (step 924).

Figure 5:
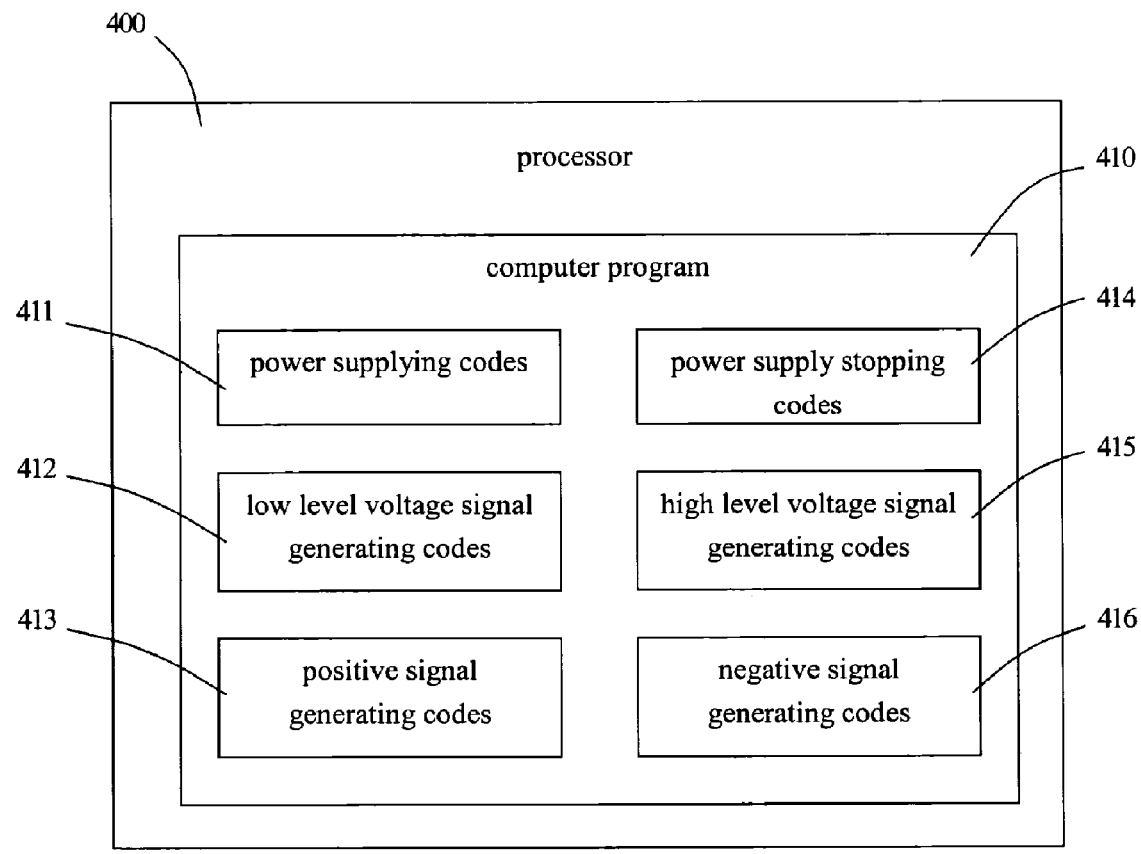
FIG. 5 is a block diagram illustrating a processor comprising a computer program in accordance with an exemplary embodiment.

Referring to FIG. 5, it is further noted that all functions aforementioned above can be performed by a processor 400 having some functional computer codes. The processor 400 includes a computer program 410. The computer program 410 includes power supplying codes 411, low level voltage signal generating codes 412, positive signal generating codes 413, power supply stopping codes 414, high level voltage signal generating codes 415, and negative generating codes 416. The power supplying codes 411 and the power supply stopping codes 414 have similar functions to those of the power source A 110. The low level voltage signal generating codes 412 and the high level voltage signal generating codes 415 have similar functions to those of the signal source 120. The positive signal generating codes 413 and the negative generating codes 416 have similar functions to those of the controlling module 210.

It should be emphasized that the above-described preferred embodiment, is merely a possible example of implementation of the principles of the invention, and is merely set forth for a clear understanding of the principles of the invention. Many variations and modifications may be made to the above-described embodiment of the invention without departing substantially from the spirit and principles of the invention. All such modifications and variations are intended to be included herein within the scope of this disclosure and the present invention and be protected by the following claims.

What is claimed is:

1. An apparatus for receiving a voltage signal from a signal source to control a rotating direction of a fan, the apparatus comprising:
   a power source;
   a first node being connected to the power source via a first resistor;
   a second node being connected to the power source via a second resistor;
   a first trigger comprising an input terminal being connected to the first node and an output terminal;
   a second trigger comprising an input terminal being connected to the second node and an output terminal;
   a first transistor being connected between the signal source and the first node for controlling the power from the power source receivable by the first trigger; and
   a second transistor being connected between the first node and the second node for controlling the power from the power source receivable by the second trigger;
   an activating module comprising a first input terminal and a second input terminal both of which are connected to the output terminal of the first trigger and the output terminal of the second trigger;
   a first negation gate being connected between the second input terminal of the activating module and the output terminal of the first trigger; and
   a second negation gate being connected between the first input terminal of the activating module and the output terminal of the second trigger.

2. The apparatus according to claim 1, wherein an operating pole of the first transistor is connected to the signal source via a third resistor.

3. The apparatus according to claim 1, wherein a grounding pole of the first transistor is connected to a first virtual ground point.

4. The apparatus according to claim 1, wherein a controlling pole of the transistor is connected to the first node.

5. The apparatus according to claim 1, wherein an operating pole of the second transistor is connected to the first node via a fourth resistor.

6. The apparatus according to claim 1, wherein a grounding pole of the second transistor is connected to a second virtual ground point.

7. The apparatus according to claim 1, wherein a controlling pole of the second transistor is connected to the second node.

8. The apparatus according to claim 1, further comprising a time delay module being connected to the signal source and the power source, the time delay module being configured for stopping rotating of the fan after a predetermined delay time has elapsed.

9. An apparatus for controlling a rotating direction of a fan, the apparatus comprising:
   a power source for supplying power for the apparatus;
   a signaling unit for generating direction-control signals;
   a switching unit connected to the power source and the signaling unit for controlling the switching unit; and
   an activating module connected between the switching unit and the fan for driving the fan to rotate in one of two opposite directions based on the direction-control signals;
   wherein the signaling unit comprises a first trigger and a second trigger, and the direction-control signals comprise a positive signal generated from the first trigger and a negative signal generated from the second trigger.

10. The apparatus according to claim 9, wherein the switching unit comprises a first transistor connected to the power source and the first trigger for controlling power of the power source to the first trigger, and a second transistor connected to the power source and the second trigger for controlling power of the power source to the second trigger.

11. The apparatus according to claim 10, wherein an operating pole of the first transistor is configured for receiving one of a low level voltage signal and a high level voltage signal.

12. The apparatus according to claim 11, wherein a grounding pole of the first transistor is connected to a first virtual ground point.

13. The apparatus according to claim 12, wherein a controlling pole of the first transistor electrically connects the power source to the first trigger.

14. The apparatus according to claim 13, wherein an operating pole of the second transistor is connected to the controlling pole of the first transistor.

15. The apparatus according to claim 14, wherein a grounding pole of the second transistor is connected to a second virtual ground point.

16. The apparatus according to claim 15, wherein a controlling pole of the second transistor electrically connects the power source to the second trigger.

17. The apparatus according to claim 9, wherein the activating module comprises a first input terminal and a second input terminal both of which are connected to the first trigger and the second trigger, a first negation gate is connected between the first trigger and the second input terminal, and a second negation gate is connected between the second trigger and the first input terminal.

18. The apparatus according to claim 10, wherein the activating module comprises a first input terminal and a second input terminal both of which are connected to the first trigger and the second trigger, a first negation gate is connected between the first trigger and the second input terminal, and a second negation gate is connected between the second trigger and the first input terminal.

19. The apparatus according to claim 18, further comprising a time delay module being connected to the power source and configured for stopping rotating of the fan after a predetermined delay time has elapsed.

20. The apparatus according to claim 10, further comprising a time delay module being connected to the power source and configured for stopping rotating of the fan after a predetermined delay time has elapsed.

* * * * *